INVENTOR.
ADAM TEMS

May 14, 1968 A. TEMS 3,383,648
MINIATURE SOCKETS
Filed Aug. 20, 1965 4 Sheets-Sheet 2
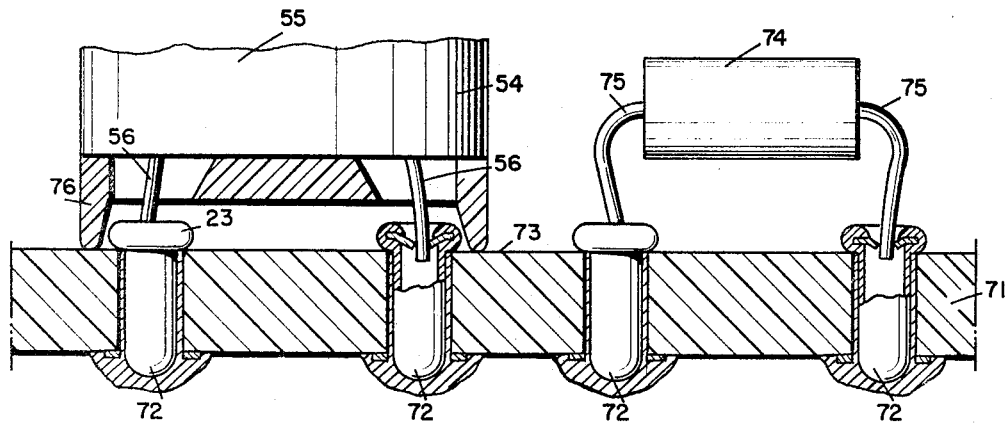
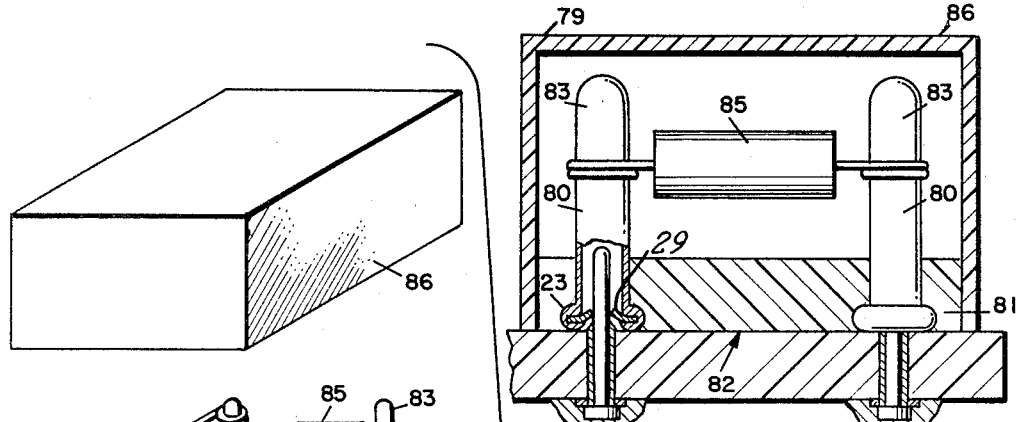
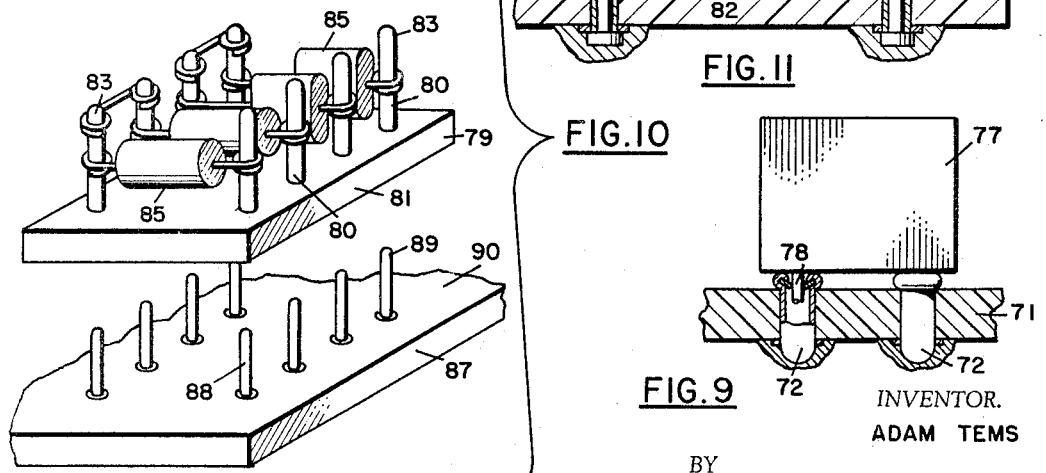
INVENTOR.
ADAM TEMS
BY Morris Michael Marks
ATTORNEY.

May 14, 1968  A. TEMS  3,383,648
MINIATURE SOCKETS
Filed Aug. 20, 1965  4 Sheets-Sheet 3
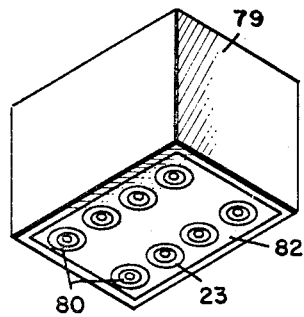
FIG. 12
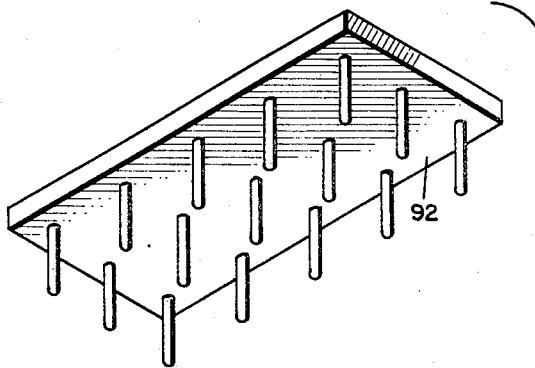
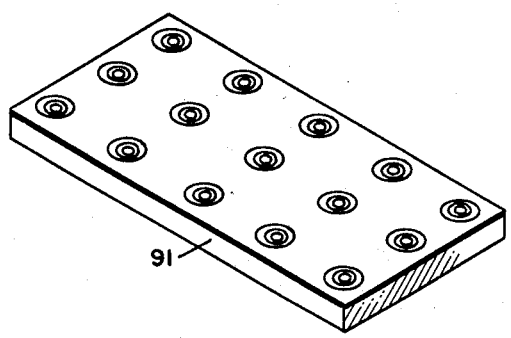
FIG. 13
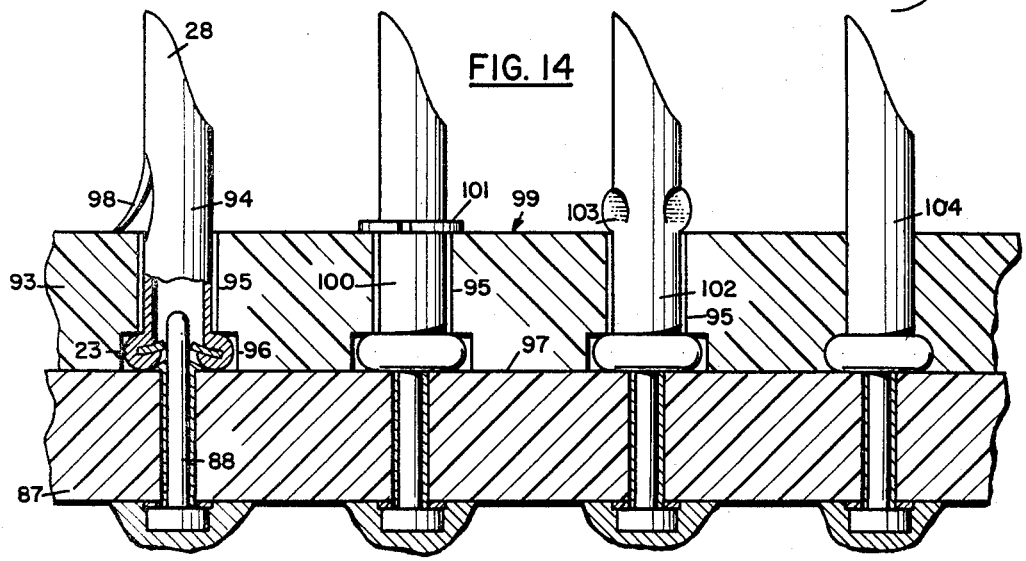
FIG. 14
INVENTOR.
ADAM TEMS
BY
*Morris Michael Marks*
ATTORNEY.

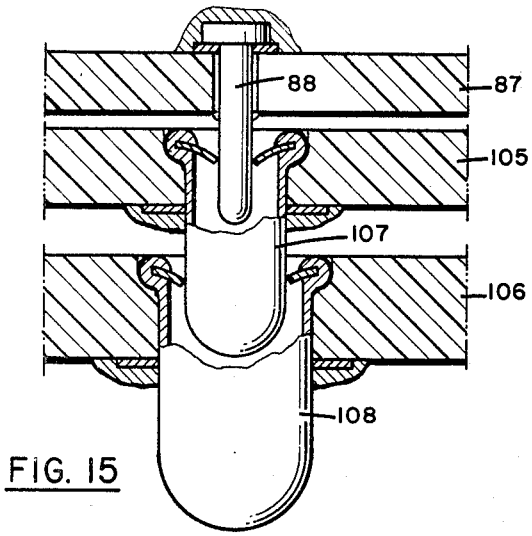
FIG. 15
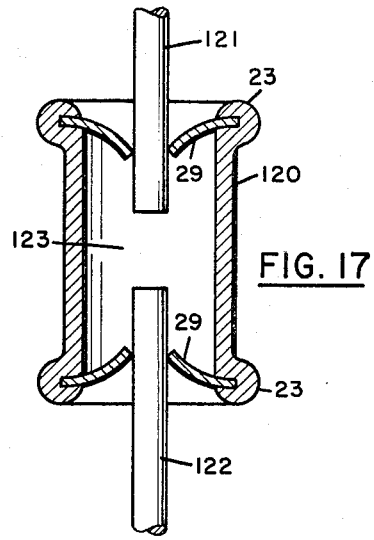
FIG. 17
FIG. 16
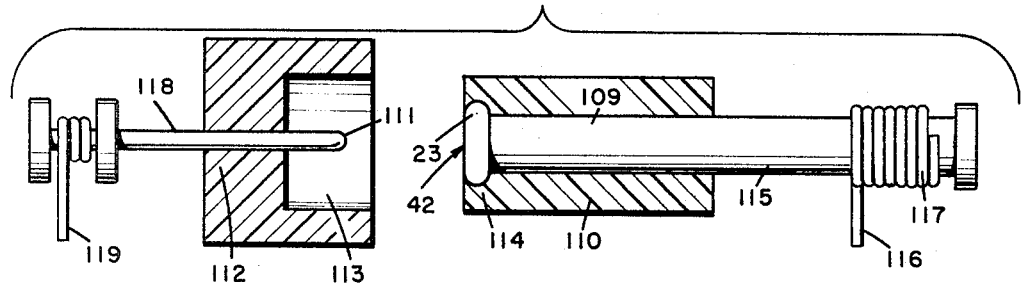
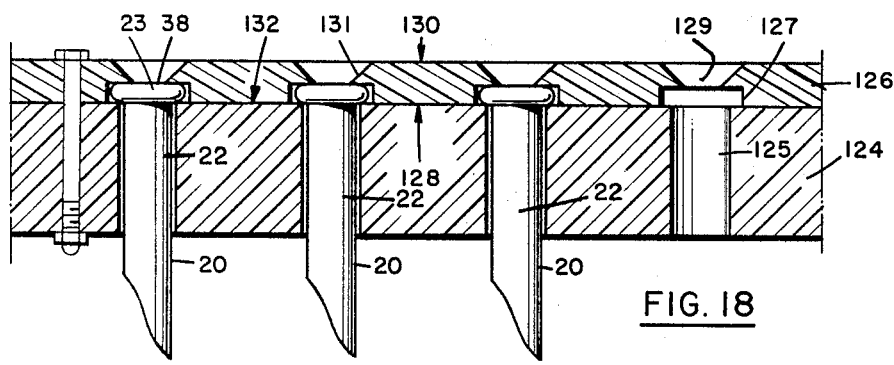
FIG. 18
INVENTOR.
ADAM TEMS
BY
Morris Michael Marks
ATTORNEY.

United States Patent Office 3,383,648
Patented May 14, 1968

3,383,648
MINIATURE SOCKETS
Adam Tems, Cherry Hill, N.J., assignor to Milton Ross
Controls Co., Inc., Southampton, Pa., a corporation of
Pennsylvania
Filed Aug. 20, 1965, Ser. No. 481,206
4 Claims. (Cl. 339—258)

ABSTRACT OF THE DISCLOSURE

An elongated miniature headed tubular contact socket having an annular catch plate in the head disposed in a plane transverse to the tubular axis, the catch plate having fingers or tongues extending radially inward toward one another with their free ends projected into the path of an entering contact so that they are engaged and deflected axially by penetration of the contact. An overlying gauge plate and/or underlying support for the catch plate are provided to prevent deflection of the tongues beyond their elastic limit by a contact.

Description

My invention relates to electrical sockets which are particularly adapted for use in miniaturization.

In the field of miniaturization, peculiar problems arise.

Thus, it may be necessary to use extremely tiny components having leads of a thickness no greater than that of a human hair. Space and weight being at a premium, it is required that lead connections be disposed as close as possible and with a minimum of connecting means. Because of the short distances involved, as well as the thinness of the conductor elements, the use of solder can prove a limiting factor. Thus, soldering heat can too readily be transmitted to the components and adversely affect them. Moreover, solder itself occupies space; and there often is no assurance that actual contact has been made between the solder and the conductor element.

Attempts have been made in the past to offset these problems in part by the use of printed circuit boards, modules, headers and connector blocks. In cases where components are connected directly to printed circuit boards by soldering, it is often necessary to space the component from the P-C board by means of a separate spacer member in order to extend the distance heat must travel from the solder before penetrating the component, and also to provide means for aerating the leads in order to dissipate the heat as much as possible. Moreover, the very presence of the components serves as a hindrance to the handling of the P-C board during the soldering operation.

Furthermore, the minuscule size of the components and leads render their handling difficult, tedious and time consuming in the assembly operation. And once the component is soldered to its connection, it cannot be replaced without remelting the solder or breaking the lead, and repeating the soldering operation for the replacement component.

Because of the limiting features relating to solder, in the use of connector blocks, modules and the like, attempts have been made to substitute socket-and-leads or socket-and-pins for solder-and-leads. The results of these attempts have not proven entirely desirable. For instance, in many cases long leads were necessary to penetrate the socket, and because of the extreme miniaturization, it was found very difficult to maneuver the flexible lead into assured contact with the socket. In other instances, there was no assurance of constant contact being made between the socket and penetrating member. Again, in the operation of some of these sockets, flexible movement was required in their outer wall, and it thus became necessary to house these sockets in an orifice of greater diameter than the maximum external diameter of the socket, thereby entailing problems of securing the sockets in place. Furthermore, many of these sockets utilized a spring-contact of such a nature as to become either fatigued or distorted beyond its elastic limit after a few insertions, or as the result of jarring or vibration.

One object of my invention therefore is to provide an electrical socket which is adapted to receive a short lead and reliably to grip the same in constant electrical contact therewith, immediately upon the penetration of the entrance to the socket.

Another object of my invention is to provide an electrical socket which is so constructed as to guide the lead into penetration of the socket as the end of the lead is advanced toward the socket.

A further object of my invention is to provide an electrical socket which is adapted to be molded as a mold insert in a P-C board, module, header, connecting block or the like.

A further object of my invention is to provide an electrical socket which is so constructed as to assure constant electrical contact with the lead immediately upon penetration of the socket, and thereafter until actual withdrawal, regardless of the presence of vibration, jarring or other forces imposed thereon.

A further object of my invention is to provide an electrical socket which is adapted to permit unlimited insertion and withdrawal of leads therefrom without fatiguing the spring member or causing it to extend beyond its elastic limit.

Another object of my invention is to provide a socket which is so constructed as to clean the surface of the lead as the lead is inserted into the socket.

A further object of my invention is to provide a socket which makes it possible to assemble components in a module or with a P-C board or the like without subjecting the components or their leads to heat or to contact with solder.

Another object of my invention is to provide a socket which makes it possible readily and easily to assemble and to replace components with a base such as a P-C board, module or the like in a minimum of time and with a maximum assurance of electrical contact.

A further object of my invention is to provide an electrical socket which is adapted itself to serve as a contact member for a similar socket.

Another object of my invention is to provide an electrical receptacle for a contact member, wherein the force required for withdrawal of the contact member will be greater than the force required for insertion thereof into the receptacle.

A further object of my invention is to provide an electrical receptacle which is simple and inexpensive to construct, certain and dependable in operation, and which will have great flexibility in utility. Additional objects will appear from the more detailed description which follows.

For the purpose of illustrating my invention, I have shown in the accompanying drawings forms thereof which are at present preferred by me, since the same have been found to give satisfactory and reliable results, although it is to understood that the various instrumentalities of which my invention consists can be variously arranged and organized, and that my invention is not limited to the precise arrangements and organizations of the instrumentalities as herein shown and described.

Referring now to the drawings in which like reference characters indicate like parts:

FIGURE 7 represents a fragmentary sectional view illustrating a receptacle of yet another modified construction embodying my invention.

FIGURE 8 represents a sectional view illustrating a P-C board having components mounted thereon by means of my invention.

FIGURE 9 represents a sectioinal view illustrating a module mounted on a P-C board by means of my invention.

FIGURE 10 represents an exploded perspective view illustrating a prongless module used in conjunction with a P-C board by means of my invention.

FIGURES 11 represents a vertical sectional view of the module and P-C board illustrated in FIGURE 10, showing the same in assembled condition.

FIGURE 12 represents a perspective view shown from beneath, of the module illustrated in FIGURES 10 and 11.

FIGURE 13 represents a perspective view illustrating separated connector blocks adapted to be connected to each other by means of my invention.

FIGURE 14 represents a vertical sectional view illustrating a connector block assembled with a P-C board by means of my invention.

FIGURE 15 represents a vertical sectional view illustrating a series of connector members in electrical contact with one another by means of my invention.

FIGURE 16 represents a sectional view illustrating a separated male and female member adapted to be connected with each other, wherein the connector elements are protected from abusive physical contact, by means of my invention.

FIGURE 17 represents a sectional view illustrating a device for connecting two leads by means of my invention.

FIGURE 18 represents a sectional view illustrating one form of assembly wherein a receptacle is assembled with a connector member, by means of my invention.

Figure 1:
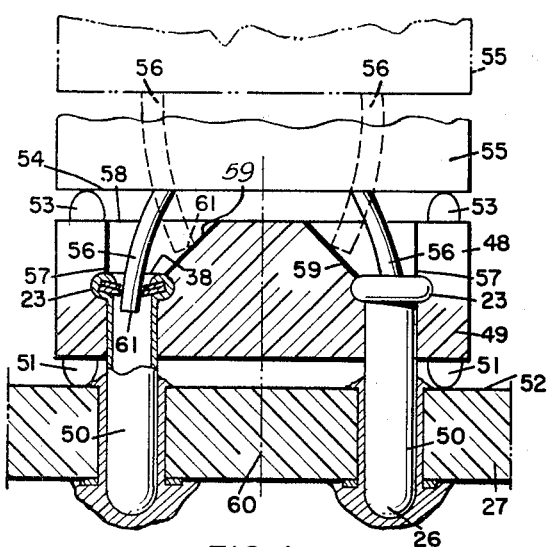
FIGURE 1 represents a vertical sectional view illustrating a miniature receptacle mounted on a P-C board and holding a transistor by means of the leads thereof, and embodying my invention.

As mentioned hereinabove the receptacles of my invention are particularly well adapted for use in mircominiature circuits, although they are not limited thereto. Nevertheless, in such circuits the advantages arising from the use of these receptacles become very apparent. Because of the minuscule sizes involved, it is not possible to illustrate these receptacles or their uses in micro-miniature circuits, by scale drawings. Accordingly the drawings herein illustrating my invention are of necessity many times natural size. It is to be understood however that they are to be interpreted as representing sizes wherein for instance the flexible lead extending from the transistor in FIGURE 1 is of the thickness of .019 inch or less and the related portions of the drawing are on a corresponding scale.

Figure 2:
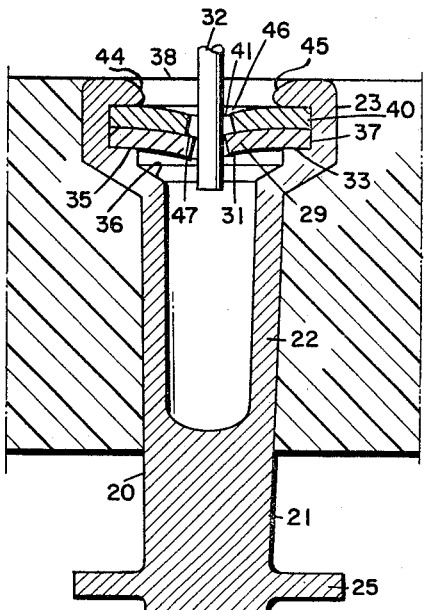
FIGURE 2 represents a sectional view illustrating a receptacle of modified construction, and further illustrating a receptacle assembled with a connector block as a mold insert therein, and embodying my invention.
Figure 3:
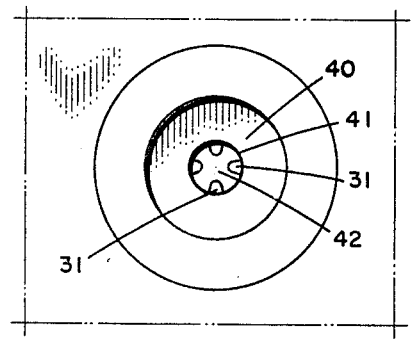
FIGURE 3 represents a top plan view of the receptacle illustrated in FIGURE 2.
Figure 4:
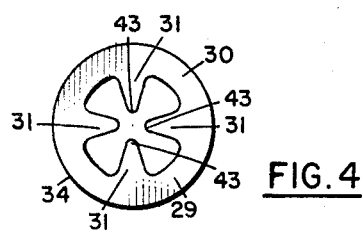
FIGURE 4 represents a plan view of the catch portion of the receptacle illustrated in FIGURES 2 and 3.

According to my invention, I provide a socket 20 which may comprise an eyelet 21 having a tubular portion 22 expanded at one end thereof into a head 23. The opposed end 24 thereof may be formed into any shape desired for suitable connecting to a circuit. Thus for instance, the opposed end 24 may be formed in the shape of a turret 25 as illustrated in FIGURE 2, rounded as at 26 for soldering to a P-C board 27, as illustrated in FIGURE 1, shaped as a soldering lug 28 as illustrated in FIGURE 14, shaped for a wire wrap as illustrated in FIGURE 16, or otherwise formed for suitable connection with a circuit. The eyelet 21 may be formed in any conventional manner and may for instance be a screw machine part as shown, or it may be formed of a flat metal stamping shaped into a hollow tube-like device by means of a transfer press; or it may be formed in any other suitable manner.

The head 23 embraces a catch 29 comprising a base portion which may consist of an annulus 30, and one or more tongues 31 inwardly projecting therefrom. The inward ends 43 of the tongue 31 are spaced a distance less than the smallest width of the contact member such for instance as the lead 32 with which the socket 20 is adapted to be interconnected. The catch 29 is preferably formed of Phosphor bronze, beryllium copper or other suitable spring material having a good conductive characteristic. The lower edge portion 33 of the outer rim 34 of the catch 29 rests upon a suitable shoulder 35 formed along the interior face of the head 23, and said rim 34 is preferably nested against a vertical wall 37 extending along said interior face toward the entrance portion 38 of the head 23.

In a preferred form, the wall 37 extends forwardly toward the entrance 38 a further distance sufficient to accommodate a gauge 40 having an opening 41 concentric with the passageway 42 defined by the interior edges 43 of the catch 29. The gauge 40 is preferably formed of the same material as that of which the catch 29 or the eyelet 21 is made, and the upper end of the head 23 is fixedly secured to both the gauge 40 and catch 29, as by welding or by being rolled over the gauge 40, as at 44, in either event tightly holding together the gauge 40, catch 29 and head 23 in a unitary substantially homogeneously conducting piece.

The diameter of the opening 41 of the gauge 40 is so related to the catch 29 that any lead 32 having such diameter and inserted therethrough will not extend the tongues 31 of the catch 29 beyond their elastic limit. The shoulder 35 and interior surface 36 rearwardly and interiorly projecting therefrom are so related to the catch 29 that the tongues 31 when resting against said surface 36 will not have passed their elastic limit. Thus, the catch 29 is protected from becoming permanently distorted or fatigued, and the tongues 31 will always tend to return to their original position whether a lead 32 is disposed therebetween or has been removed from the socket 20.

In a preferred form, the rolled over edge 44 comprises an annulus having an inwardly and rearwardly inclined surface 45, the gauge 40 is inwardly depressed to provide its own inwardly and rearwardly inclined surface 46 of an exposed annulus extending from the inner edge of the rim 45 to the opening 41, and the tongues 31 may be inwardly depressed to provide their own inwardly and rearwardly inclined surfaces 47. In this manner, a series of rearwardly camming surfaces 45, 46 and 47 are provided to guide the lead 32 into the socket 20.

In FIGURE 1 is illustrated a receptacle 48 comprising a transistor mounting pad 49 and sockets 50 molded therein as mold inserts. The transistor mounting pad 49 may comprise feet 51 adapted to rest upon the upper surface 52 of a P-C board 27, and may also if desired comprise feet 53 upwardly projecting therefrom in a manner to support the base 54 of a transistor 55. Short, flexible leads 56 extend beneath the base 54 and project downwardly therefrom.

A channel 57 is disposed in the transistor mounting pad 49 beneath each of the leads 56 and is disposed above and in registry with the head 23 of one of the sockets 50, said head being disposed a substantial distance beneath the upper edge 58 of the transistor mounting pad 49. The channel 57 comprises an inwardly and upwardly inclined wall 59 extending from that portion of the head 23 which is disposed nearest the longitudinal axis 60 of the mounting pad 49, to the upper edge 58 of said pad 49. There is thus formed a camming surface 59 adapted to receive the lower edge 61 of the transistor lead 56, and to guide it downwardly into the entrance 38 of the socket 50 whereupon it is further guided by the camming surfaces 45, 46 and 47 into the interior thereof as the transistor 55 is advanced downwardly toward the P-C board 27 until the base 54 rests upon the upper feet 53 of the transistor mounting pad 49. In this process, the flexible lead 56 is scraped by the interior edges 43 of the catch 29, thereby removing oxides, corrosion or dirt therefrom and assuring clean electrical contact between the lead 56 and the socket 50.

It will be noted in this manner, the transistor is tightly and securely connected to the P-C board and in assured electrical contact therewith without in any way subjecting the transistor or its leads to heat or solder, and also the assembling process is achieved with no more manipulation than that required to press the transistor base against the mounting pad with the leads positioned above the channels 57.

Figure 5:
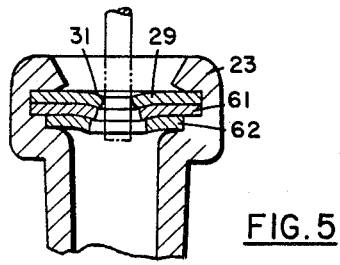
FIGURE 5 represents a fragmentary sectional view illustrating a receptacle of another modified construction embodying my invention.

In FIGURE 5 is illustrated a modified construction wherein the catch 29 is supported on a resilient cushion consisting of one or more ring members 61, 62, said catch 29 and cushion members 61, 62 being tightly embraced within the head 23. In this manner, the tongues 31 are protected against distortion beyond their elastic limit.

Figure 6:
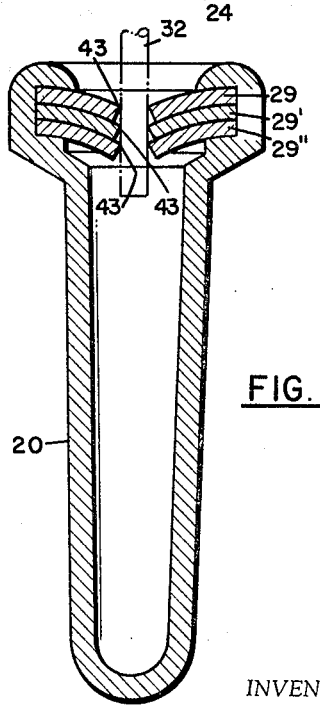
FIGURE 6 represents a sectional view of a receptacle of a further modified construction embodying my invention.

In FIGURE 6 is illustrated another modified construction wherein a plurality of catches 29, 29' and 29" are disposed one beneath another within the head 23. In this manner, a multiplicity of interior edges 43 are progressively disposed against the lead or other contact member 32 as the contact member 32 is advanced into the interior of the socket 20, operably further to scrape the surface of the contact member 32 and to hold the same against withdrawal.

In FIGURE 7 is illustrated a further modified construction wherein the socket is formed of one piece. Thus, in this modification the socket may be referred to as formed of a tubular member 63 having a head 64 inwardly turned and rearwardly inclined as at 65 to form an inwardly and rearwardly camming surface 66 leading to a central passageway 67 of an effective diameter less than that of the contact member with which the socket is to be used. Slots 68 are formed through the inwardly and rearwardly inclined portion in a manner to separate said portion into spring-like segments 69 having inner edges 70 adapted to scrape the sides of the contact member and to hold the same against withdrawal when the contact member has been inserted through the passageway 67.

In FIGURE 8 is illustrated a P-C board having disposed therein a series of sockets 72 having the heads 23 thereof resting upon the top face 73 of the P-C board 71. The sockets 72 are secured to the printed circuit by soldering in the customary manner. When it is desired to connect a component such for instance as a transistor 55 or a resistor 74 to the P-C board 71, it is merely necessary to push their respective leads 56, 75 into the appropriate sockets 72 until the passageways thereof have been penetrated and the leads gripped therein. If desired, a transistor mounting pad 76 may be used to aid in avoiding a sharp angle between the lead 56 and the base 54 of the transistor 55.

In FIGURE 9 is illustrated a module 77 secured to a P-C board 71 by means of sockets 72 secured to said board in substantially the same manner as said sockets are secured to the board 71 illustrated in FIGURE 8. The module 77 comprises pins 78 projecting downwardly therefrom and said pins are inserted in the socket 72 in substantially the same manner as the leads 56, 75 illustrated in FIGURE 8.

In FIGURES 10, 11 and 12 are illustrated a module 79 wherein sockets 80 are disposed in the base 81 thereof with the heads 23 formed flush with the bottom face 82 of the base 81, and the tubular portions of the sockets 80 projecting upwardly above the base 81 to form the contact posts 83. Components 85 are selectively mounted between the posts 83 and secured thereto according to any desired circuitry. A cap 86 is disposed about the base 81 in a manner to cover the components 85 and posts 83, and the base 81 and cap 86 are encapsulated into one unit. It will be noted that there are no prongs or other projecting members extending from the module 79, and there is thus no danger of damage to any projecting part.

The cooperating P-C board 87 has extending therefrom pins 88 such as the simple and inexpensive pins illustrated in FIGURE 14 which are soldered to the circuitry of the P-C board, and whose free ends 89 project upwardly from the top surface 90 of the board 87. The pins 88 are adapted to penetrate the sockets 80 and to be held in tight and electrically communicating engagement therewith by the catches 29 disposed within the heads 23 thereof. The pins 88 being far less expensive than the sockets 80 the cost of the combination is greatly reduced while full flexibility of circuitry is maintained.

In FIGURE 13 is illustrated cooperating connecting members 91 and 92 wherein sockets are disposed in the member 91 and pins are mounted in and project from the member 92. It is to be understood that the members 91, 92 may consist of headers, connecting blocks, P-C boards, modules or other desired connecting members.

In FIGURE 14 is illustrated various means of securing sockets to a connecting member 93. Thus for instance, the socket 94 may pass through an orifice 95 having a countersunk portion 96 disposed at the lower end of the orifice 95, said countersunk portion 96 being adapted to receive the head 23 of the socket 94 and to dispose the lower edge of the head 23 flush with the lower face 97 of the member 93. A spring finger 98 may be stamped out of one side of the socket 94 and outwardly sprung therefrom so that as the socket 94 is inserted through the orifice 95 and the head 23 is fully disposed within the countersunk portion 96, the spring finger 98 will pass through the orifice 95 and spring outwardly into bearing engagement with the upper face 99 of the member 93, thereby locking the socket 94 in place.

The socket 100 is similarly disposed within a similar orifice 95 and is held in place by means of a C-ring 101. The socket 102 is likewise disposed in a similar orifice 95 and is held in place by means of crimps 103. The socket 104 may be molded directly within the member 93 as a mold insert therein.

In FIGURE 15 is illustrated a series of members 87, 105 and 106 electrically secured to one another by means of my invention. Herein the pin 88, electrically connected to the P-C board 87, is shown as projecting downwardly into a socket 107 disposed in and electrically connected to the member 105 and itself projecting downwardly therefrom to form a contact projection 107 which itself is disposed within the socket 108 formed within the member 106 and electrically connected thereto. By this means, a series of connector members may be safely and reliably interconnected without the use of solder.

In FIGURE 16 is illustrated means for connecting two leads by means of my invention. Herein, a socket 109 having a head 23 is disposed within a suitable dielectric member 110 which is capable of being manually held or manipulated. A cooperating contact pin 111 projects through a dielectric member 112 and into the interior of a recess 113 adapted to receive the end portion 114 of the dielectric member 109 which holds the head 23, with the pin 111 in alignment with the passageway 42 of the socket 109. The rearward end portion 115 of the socket 109 projects rearwardly from the dielectric member 110 and has the lead 116 secured thereto by any suitable means such as the wire wrap 117. The rearward end portion 118 of the pin 111 projects rearwardly from the dielectric member 112 and has the lead 119 secured thereto by any suitable means. In operation, the dielectric member 110 is pushed into the recess 113, thereby guiding the pin 111 into the passageway 42 of the socket 109. When it is desired to terminate the connection, it is merely necessary to pull the members 110 and 112 apart.

In FIGURE 17 is shown another means for connecting two leads to each other, utilizing my invention. In this modification, a tubular member 120 is provided having heads 23 at both ends. Suitable catches 29 are disposed within the heads 23 and are adapted to receive and to hold leads 121 and 122 respectively advanced into the interior 123 of the tubular member 120 through the oppositely disposed catches 29.

In FIGURE 18 is illustrated a further means whereby sockets of my invention may be inserted in connecting members. In this modification, a base panel 124 is provided with suitable orifices 125. A cooperating panel 126 is provided with countersunk portions 127 disposed in registry with the orifices 125 when the cooperating panel 126 is laid against the panel 124. The countersinks 127 project upwardly from the lower face 128 of the cooperating panel 126 and lead into communication with suitable countersinks 129 extending downwardly from the upper face 130 of the panel 126. The upper countersinks 129 preferably each have an inwardly and downwardly extending face 131.

In operation, the sockets 20 are inserted in place with their tubular portions 22 passing through the orifices 125 and their heads 23 resting on the upper face 132 of the panel 124. The cooperating panel 126 is then laid in place with the faces 128 and 132 abutting one another and the countersinks 127 in registry with the orifices 125. In this manner the countersinks 127 embrace the heads 23, and the upper countersinks 129 serve as camming surfaces 131 to lead contact members 32 into the entrance 38 of the sockets 20.

It has been found that in the use of my invention, relatively little force is required to insert a contact member into the socket, and appreciably greater force is required to withdraw it therefrom. Moreover, great flexibility is assured in that components, connecting members, and contact members may readily be connected with, and disconnected from, a socket a virtually unlimited number of times; and in combinations of sockets and pins, combinations can be utilized having a greater number of simple, inexpensive pins than the more expensive sockets. Also, the socket of my invention makes it possible to eliminate the use of prongs in cases where such prongs might be subject to damage. Moreover, the construction of the socket of my invention is such as to permit its use as an insert in insert molding of plastic. In addition, the socket of my invention can be made under conditions of excellent quality control, and has proven completely reliable in operation. Also, in use it has assured constant contact regardless of exposure to jarring or vibration.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

What I claim as new and desire to secure by Letters Patent is:

1. An electrical socket for receiving a contact member by projection of the latter axially into the socket, comprising in combination,
    (a) an elongated electrically conductive portion having an axially extending passage therein and provided with an enlarged diameter head at least at one end thereof, the said passage being of larger size in transverse dimension than the contact member intended for projection thereinto,
    (b) an electrically conductive contact member catch fixedly mounted in said head in good electrical contact therewith, said catch including
        (1) an annular base disposed in a plane transverse to the said axially extending passage having an inside transverse open dimension greater than the transverse dimension of the contact member to be projected therethrough, and
        (2) a plurality of resilient spring tongues extending from said base freely inward toward one another into the said passage to restrict the latter to an axial opening less than the transverse dimension of the contact member so that the free ends of said spring tongues are deflected axially by the contact member as the latter is projected into the passage, and
    (c) means disposed beneath said catch within said head effective to limit the axial deflection of said catch tongues by the contact member to a degree which does not exceed the elastic limit thereof.
2. An electrical socket as defined in claim 1 further including a gauge disposed in said head in overlying relation to said catch and having an opening therethrough coaxial with said passage, said gauge opening being of a size to just permit passage therethrough of a contact member whose projection into said passage will not deflect said catch tongues beyond their elastic limit.
3. An electrical socket as defined in claim 1 wherein said last named means comprises a cushion element.
4. An electrical socket as defined in claim 1 wherein said last named means comprises a tapered stop surface within said head against which said catch tongues are pressed before deflection to their elastic limit.

References Cited
UNITED STATES PATENTS

| | | | |
|---|---|---|---|
| 1,950,616 | 3/1934 | Kyle | 339—257 X |
| 2,295,266 | 9/1942 | Obszarny | 339—95 |
| 2,473,705 | 6/1949 | George. | |
| 2,484,192 | 10/1949 | Squiller. | |
| 2,566,593 | 9/1951 | Broomfield | 85—36 |
| 2,648,883 | 8/1953 | Dupre. | |
| 2,876,424 | 3/1959 | Stiler. | |
| 2,972,728 | 2/1961 | Cole | 339—252 X |
| 3,155,808 | 11/1964 | Wiley. | |
| 3,156,517 | 11/1964 | Maximoff. | |
| 3,292,138 | 12/1966 | Jones et al. | |

FOREIGN PATENTS

| | | |
|---|---|---|
| 855,711 | 2/1940 | France. |
| 910,748 | 2/1946 | France. |
| 948,428 | 8/1956 | Germany. |
| 659,447 | 10/1951 | Great Britain. |
| 795,597 | 5/1958 | Great Britain. |
| 6,868 | 11/1956 | Germany. |

PATRICK A. CLIFFORD, *Primary Examiner.*

MARVIN A. CHAMPION, *Examiner.*

PERRY TEITELBAUM, *Assistant Examiner.*